United States Patent
Marchand et al.

(10) Patent No.: US 12,028,398 B2
(45) Date of Patent: Jul. 2, 2024

(54) MANAGEMENT OF THE HTTP ADAPTIVE STREAMING OF AN ITEM OF DIGITAL CONTENT IN SCREEN SAVER MODE

(71) Applicant: Orange, Issy-les-Moulineaux (FR)

(72) Inventors: Hervé Marchand, Chatillon (FR); Mathieu Rivoalen, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 0 days.

(21) Appl. No.: 17/847,878

(22) Filed: Jun. 23, 2022

(65) Prior Publication Data
US 2022/0417311 A1    Dec. 29, 2022

(30) Foreign Application Priority Data
Jun. 24, 2021   (FR) ..................... 2106732

(51) Int. Cl.
| | | |
|---|---|---|
| *H04L 65/80* | (2022.01) | |
| *H04L 65/1108* | (2022.01) | |
| *H04L 65/61* | (2022.01) | |
| *H04L 65/75* | (2022.01) | |

(52) U.S. Cl.
CPC ........ *H04L 65/765* (2022.05); *H04L 65/1108* (2022.05); *H04L 65/61* (2022.05); *H04L 65/80* (2013.01)

(58) Field of Classification Search
CPC ... H04L 65/765; H04L 65/1108; H04L 65/61; H04L 65/80
See application file for complete search history.

(56) References Cited

U.S. PATENT DOCUMENTS

| | | |
|---|---|---|
| 2006/0104348 A1 | 5/2006 | Chen et al. |
| 2008/0170058 A1* | 7/2008 | Ahn ................ H04N 7/141 348/E7.078 |
| 2013/0329777 A1 | 12/2013 | Konda et al. |
| 2016/0183188 A1* | 6/2016 | Tsai ................ H04W 52/0229 370/311 |

(Continued)

FOREIGN PATENT DOCUMENTS

| | | |
|---|---|---|
| EP | 3122057 A1 | 1/2017 |
| FR | 3081274 A1 | 11/2019 |

(Continued)

OTHER PUBLICATIONS

Han et al., "Service-Oriented Power Management for an Integrated Multi-Function Home Server", IEEE Transactions on Consumer Electronics, vol. 53, No. 1, Feb. 2007.

(Continued)

*Primary Examiner* — Oanh Duong
(74) *Attorney, Agent, or Firm* — Knobbe, Martens, Olson & Bear, LLP

(57) ABSTRACT

A method for managing the HTTP adaptive streaming of an item of digital content within a multimedia stream player terminal in a local communication network is disclosed, the multimedia stream player terminal being associated with a terminal for rendering the item of digital content. On detection of an active state of a screen saver mode of the rendering terminal, such a management method implements a progressive reduction of a video rendering quality of the streamed item of digital content, and maintains an audio rendering quality of the item of content.

11 Claims, 4 Drawing Sheets

(56) References Cited

U.S. PATENT DOCUMENTS

2019/0174185 A1\* 6/2019 Leduby .............. H04N 21/4516
2020/0045384 A1\* 2/2020 Nilsson ................. H04N 21/84

FOREIGN PATENT DOCUMENTS

| FR | 3081647 A1 \* | 11/2019 | |
|----|----|----|----|
| WO | WO 201436522 A2 | 3/2014 | |
| WO | WO 201436522 A3 | 3/2014 | |
| WO | WO-2016040052 A1 \* | 3/2016 | ..... H04N 21/234327 |
| WO | WO-2018060490 A1 \* | 4/2018 | ....... H04N 21/23406 |
| WO | WO-2020206688 A1 \* | 10/2020 | ........... G06K 9/6269 |

OTHER PUBLICATIONS

Anthony Vetro, "The Green Metadata Standard for Energy-Efficient Video Consumption", IEEE Computer Society, Jan.-Mar. 2015.
Mkwawa et al., "Power-Driven VoIP Quality Adaptation Over WLAN in Mobile Devices", GC'12 Workshop: Quality of Experience for Multimedia Communications, 2012.
Xavier Ducloux, "Green Adaptive Streaming", Thomson Video Networks, CF' 15: Proceedings of the $12^{th}$ ACM International Conference on Computing Frontiers, May 2015.
Written Opinion on the Patentability of the Invention for French Application No. FR2106732, dated Apr. 11, 2022.

\* cited by examiner

MANAGEMENT OF THE HTTP ADAPTIVE STREAMING OF AN ITEM OF DIGITAL CONTENT IN SCREEN SAVER MODE

CROSS-REFERENCE TO RELATED APPLICATIONS

This application claims foreign priority to French Patent Application No. FR 2106732, entitled "MANAGEMENT OF THE HTTP ADAPTIVE STREAMING OF AN ITEM OF DIGITAL CONTENT IN SCREEN SAVER MODE" and filed Jun. 24, 2021, the content of which is incorporated by reference herein in its entirety.

BACKGROUND

Field

The field of the development is that of digital multimedia contents, namely digital video and/or audio contents, which may be routed to a multimedia stream player terminal of a local communication network, according to a technique referred to as HTTP adaptive streaming (HAS).

More specifically, the development relates to the optimization of bandwidth resources consumed by such a content streaming.

Description of the Related Technology

Access to an item of multimedia content, such as television or video on demand, from a network of Internet type, is currently possible, for most rendering terminals, particularly when they belong to a local communication network, such as a home network.

The terminal generally emits a request to a server, by indicating the chosen content and it receives in return a stream of digital data relating to this content. Within the scope of a local communication network, such a request transits through the access gateway to the network, for example the residential gateway.

The terminal is adapted to receive these digital contents in the form of multimedia data and to produce a rendering thereof. This rendering involves providing at the terminal the item of digital content in a form accessible to the user. For example, data received corresponding to a video are generally decoded, then rendered at the terminal in the form of a display of the corresponding video with its associated sound track.

The broadcasting of digital contents over the Internet is often based on client-server protocols of the HTTP (Hyper Text Transport Protocol) family. In particular, the downloading in progressive mode of digital contents, also referred to as streaming, makes it possible to transport and consume the data in real time, that is to say that the digital data are transmitted over the network and rendered by the terminal as and when they arrive. The terminal receives and stores a portion of the digital data in a buffer memory before rendering them. This broadcasting mode is particularly useful when the bitrate that the user disposes is not guaranteed for the real-time transfer of the video.

HTTP adaptive streaming (HAS for short), what is more makes it possible to broadcast and receive data according to various qualities corresponding for example to various bitrates. These various qualities are described in a parameter file available by downloading on a data server, for example a content server. When the client terminal desires to access an item of content, this description file makes it possible to select the correct format for the item of content to be consumed depending on the available bandwidth or the storage and decoding capacities of the client terminal. This type of technique particularly makes it possible to take into account variations in bandwidth on the link between the client terminal and the content server.

A plurality of technical solutions exist to facilitate the broadcasting of such an item of content by streaming, such as for example the proprietary solutions Microsoft® Smooth Streaming, Apple® HLS, Adobe® HTTP Dynamic Streaming or the MPEG-DASH standard of the ISO/IEC organisation that will be described hereafter. These methods propose to send to the client one or more intermediate description files, also referred to as documents or manifests, containing the addresses of the various video segments with the various qualities of the multimedia content.

Thus, the MPEG-DASH (Dynamic Adaptive Streaming over HTTP) standard is a format standard for audiovisual broadcasting over the Internet. It is based on the preparation of the content in various presentations of variable quality and bitrate, sliced into short-term segments (in the order of a few seconds), also referred to as chunks. Each of these segments is rendered available individually by means of an exchange protocol. The protocol mainly targeted is the HTTP protocol, but other protocols (for example FTP) may also be used. The organisation of video segments and the associated parameters are published in a manifest in XML format.

The underlying principle to this standard is that the MPEG-DASH client performs an estimation of the available bandwidth for the receipt of segments, and, depending on the filling of its reception buffer, chooses, for the next video segment to be loaded, a representation the bitrate of which:
ensures the best possible quality,
and makes possible a reception delay compatible with the uninterrupted rendering of the content.

Thus, in order to adapt to the variation in network conditions, particularly in terms of bandwidth, the existing adaptive streaming solutions make it possible for the client terminal to switch from an encoded version of the content at a certain bitrate, to another encoded at another bitrate, during the streaming. Indeed, each version of the content is divided into video segments of the same duration. In order to make it possible to continuously render the content on the terminal, each segment must reach the terminal before its programmed rendering instant. The perceived quality associated with a segment increases with the size of the segment, expressed in bits, but over the same time, larger segments require a longer transmission time, and therefore have an increased risk of not being received in time for a continuous rendering of the content.

The rendering terminal must therefore find a compromise between the overall quality of the content, and its uninterrupted rendering, by carefully selecting the next segment to be downloaded, from the various encoding rates proposed. For this, various algorithms exist for selecting the quality of the content depending on the available bandwidth, which may have more or less aggressive, or more or less secure strategies.

The consumption of digital contents during HTTP adaptive streaming (HAS) is tending to become more accessible. It is particularly used by many streaming services, but also by certain TV decoders, or set-top-boxes, which use it to access offline content, such as Video on Demand (VOD), the pre-recording of television programmes (Replay), or offers of the type Network PVR (Network Personal Video Recorder, i.e. a service for recording digital contents, performed by the content provider itself rather than in the home of the end user).

In homes, the terminals making it possible to operate such an HTTP adaptive streaming of contents are also increasingly widespread. These terminals, that can be qualified as multimedia stream player terminals, may integrate a rendering screen, as is the case of smart TVs, or be coupled to a rendering terminal (for example, a video games console, connected to a television).

They increasingly integrate a screen saver function, which aims to preserve the quality of the rendering screen, by preventing static information being displayed for too long on the latter, which would be likely to result in a remanence phenomenon. Conventionally, when the screen saver mode is activated, a standby screen is displayed, which may for example project to the user a series of images, or also the current time, or also an animation of the logo of the brand of the terminal.

The configuration of this screen saver function is performed by the manufacturer of the rendering terminal, who programmes, on the one hand, the type of standby screen to be displayed, and on the other hand, the maximum duration for displaying static information that the screen can support, and based on which the screen saver mode should be activated. This duration is variable particularly depending on the technology for displaying information on the screen (LCD (Liquid Crystal Display), LED (Light-Emitting Diode), OLED (Organic Light-Emitting Diode) screen, etc.). It is chosen by the manufacturer of the rendering screen. Most of the time, switching to the active state of the screen saver mode is subject to a notification that may be detected by the various software applications that are being executed on the multimedia stream player terminal.

However, displaying the standby screen, during the activation of the screen saver mode, does not result in the interruption of the multimedia stream that is played by the active software application. Indeed, such multimedia stream player terminals, such as smart TVs, are particularly used in home environments for radio, or music (like Deezer® or Spotify® for example) type applications. It is essential that the audio stream downloaded by these applications can continue to be rendered to the user, without modification, even when the rendering screen switches into a screen saving mode.

However, for the applications that do not only render an audio stream, but also a video stream, the video data that continue to be downloaded by the active applications are of no use, because the standby screen displayed in screen saver mode masks the rendering thereof.

Thus, when a user launches the TV application developed by the Applicant, a home page is displayed, referred to as DESK, on which figure a set of static images, corresponding to various items of a menu, such as access to video on demand (VOD), access to pre-recorded content (Replay), access to the electronic program guide (EPG), etc. In addition to these static images, a real-time video stream is displayed in the background, corresponding to the last TV channel viewed by the user.

Displaying these static images makes it necessary to activate the screen saver mode, in the event of prolonged inactivity of the user, in order to prevent any deterioration of the screen. However, when this screen saver mode is activated, the TV application continues the real-time downloading of the multimedia stream corresponding to the last TV channel viewed by the user, whereas the rendering of associated images is masked by the standby screen chosen by the manufacturer of the rendering terminal.

This proves to be problematic, because the downloading and the playing of this video content are unnecessarily users of bandwidth on the network of the user; they also consume resources on the service platforms of the operator who makes the item of content available, and this, serving no purpose.

Therefore, there is a need for a technique for managing the streaming of content, in a screen saver mode, which does not have these various drawbacks of the prior art. More specifically, there is a need for such a technique that makes it possible to preserve the resources and the bandwidth, by both the user, and the operator, when the rendering terminal of the user is in screen saver mode. There is also a need for such a technique that offers the user a satisfactory quality of experience, and particularly a rapid rendering of the desired item of content, when they end their period of inactivity.

SUMMARY

The development meets this need by proposing a method for managing the HTTP adaptive streaming of an item of digital content within a real-time multimedia stream player terminal in a local communication network. The multimedia stream player terminal is associated with a terminal for rendering the digital content. In one embodiment, the multimedia stream player terminal and the rendering terminal are integrated into the same user equipment, for example a smart TV.

On detection of an active state of a screen saver mode of the rendering terminal, such a management method implements a progressive reduction of a video rendering quality of the streamed item of digital content, but maintains an audio rendering quality of the item of content.

Thus, the development is based on an entirely novel and inventive approach of the management of the HTTP adaptive streaming of an item of content, in the particular context of the existence of a screen saving function on the rendering terminal.

Indeed, the management method according to one embodiment of the development proposes, in the event of activation of the screen saver mode of the rendering terminal, to progressively reduce the quality of the video stream that is rendered to the user. This rendering being masked by the standby screen the display of which has been activated, the user does not perceive degradation of the rendering quality of the item of content.

However, this progressive reduction of the quality makes it possible to reduce the consumption of bandwidth and of resources, for both the network of the user, and the service platforms of the operator, which is advantageous.

Furthermore, the management method according to one embodiment of the development advantageously makes it possible to continue streaming the item of content, even if it is done in a degraded quality, which makes it possible to display the video stream immediately after the disappearance of the standby screen, when the user exits their period of inactivity, by pressing for example on a key of the remote control associated with the multimedia stream player terminal.

Finally, the management method according to one embodiment of the development proposes to maintain the audio rendering quality of the item of content, in spite of the detection of the activation of the screen saver mode, which is particularly advantageous when the downloaded multimedia stream is an audio stream only, for example for audio streaming of music or of a radio station.

According to one embodiment, the item of digital content being associated with a file for describing the item of digital content, comprising a list of video time segments of the item of content each associated with a plurality of encoding rates of the item of content, said progressive reduction of a video rendering quality of the streamed item of digital content is based on a streaming of video time segments of the item of content associated with encoding rates decreasing over time.

Thus, the solution of the development is based on the capacities of the HAS technology. Indeed, an item of content broadcast in HAS is proposed to the client at various encoding rates. Depending on the network conditions, the HAS client embedded in the multimedia stream player terminal (for example a smart TV or an HDMI key) constantly adapts the quality of the downloaded stream, in order to be able to benefit from the best possible rendering quality, while ensuring a rendering fluidity of the item of content on the rendering terminal (e.g. the television). For this, it carries out the streaming of the time segment proposed at the optimal encoding rate, depending on the bandwidth and resource constraints of the network.

According to the development on the contrary, a soon as it is detected that the rendering terminal is switched into screen saver mode, the multimedia stream player terminal no longer streams the video time segments of the item of content at the optimal encoding rate, but streams time segments at increasingly reduced encoding rates, until the lowest video rendering quality of the item of content is reached. This progressive decrease of the encoding rates of the streamed time segments may be carried out for example over a period of one hour, from the optimal rate in relation to the resource constraints of the network, up to the lowest flow rate proposed in the manifest associated with the item of content.

According to one embodiment, at the end of a predetermined duration period of absence of interaction of a user with the multimedia stream player terminal and/or the rendering terminal after detection of the active state of the screen saver mode, such a management method implements an interruption of the streaming of video time segments of said item of content.

Thus, it is possible to progressively reduce the quality of the video segments streamed during a chosen duration period, at the end of which, if the user still has not interacted with the terminal, the downloading of the multimedia stream is interrupted. Thus, an interruption of the HDMI stream is carried out, in order to prevent an unnecessary consumption of the network resources and of the resources of the service platforms of the content provider. It is important that this duration is chosen correctly, and particularly long enough, to prevent any deterioration of the quality of experience of the user. Indeed, in the event of interruption of the stream, the user must deal with a high latency time, before once again accessing the rendering of the item of content.

According to one embodiment, on detection of the active state of the screen saver mode of the rendering terminal, it also implements a progressive reduction of a rendering sound volume of the item of content. Preferably, this reduction of the rendering sound volume of the audio stream is only carried out if the streamed item of content is an audio or video stream. In the case where the item of content is an item of audio content only, for example music coming from a radio station, it is preferable that switching into screen saver mode does not impair the experience of the user.

According to one embodiment, on detection of an interaction of the user with the multimedia stream player terminal and/or with the terminal for rendering the item of digital content, the screen saver mode of the rendering terminal switches into an inactive state and the progressive reduction of the rendering quality is interrupted. Such a method then implements a streaming of time segments of the item of content associated with optimized encoding rates depending on a resource constraint estimated by the real-time multimedia stream player terminal.

Thus, if it is detected that the user exits their period of inactivity, for example by pressing a key of their remote control, there is a return to the normal operating mode, wherein the standby screen is deactivated, and wherein the streaming of the segments of content is carried out according to the conventional HAS technique.

The development also relates to a computer program product comprising program code instructions for implementing a method for managing the HTTP adaptive streaming of an item of content as described above, when it is executed by a processor.

The aim of the development is also a computer-readable recording medium whereon a computer program is recorded comprising program code instructions for executing the steps of the method for managing the HTTP adaptive streaming of an item of digital content according to the development, as described above.

Such a recording medium may be any entity or device capable of storing the program. For example, the medium may include a storage means, such as a ROM, for example a CD ROM or a microelectronic circuit ROM, or also a magnetic recording means, for example a USB key or a hard drive.

On the other hand, such a recording medium may be a transmissible medium such as an electrical or optical signal, which may be routed via an electrical or optical cable, by radio or by other means, so that the computer program that it contains can be executed remotely. The program according to the development may in particular be downloaded on a network for example the Internet network.

Alternatively, the recording medium may be an integrated circuit wherein the program is incorporated, the circuit being adapted to execute or to be used in the execution of the aforementioned display control method.

The development also relates to a device for managing the HTTP adaptive streaming of an item of digital content within a multimedia stream player terminal in a local communication network, the multimedia stream player terminal being associated with a terminal for rendering the item of digital content. Such a device comprises: a module for detecting an active state of a screen saver mode of the rendering terminal, and a streaming management module, configured to progressively reduce a video rendering quality of the streamed item of digital content and maintain an audio rendering quality of the item of content, on detection of the active state of the screen saver mode.

According to one embodiment, the item of digital content being associated with a file for describing the item of digital content, comprising a list of video time segments of the item of content each associated with a plurality of encoding rates of the item of content, the streaming management module comprises means for emitting commands for the streaming of video time segments of the item of content associated with encoding rates decreasing over time.

The development also relates to a smart TV, comprising a multimedia stream player configured for the HTTP adaptive streaming of an item of digital content, and a screen for rendering the streamed item of digital content. Such a smart TV comprises a module for detecting an active state of a screen saver mode of the rendering screen. On detection of the active state of the screen saver mode, the multimedia stream player module is configured to progressively reduce a video rendering quality of the streamed item of digital content and to maintain an audio rendering quality of the item of content.

The abovementioned corresponding device for managing the HTTP adaptive streaming of content, the smart TV and the computer program have at least the same advantages as those conferred by the method for managing the HTTP adaptive streaming of content according to the present development.

BRIEF DESCRIPTION OF THE DRAWINGS

Other aims, features and advantages of the development will become more apparent upon reading the following description, given by way of simple illustrative, and non-limiting example, in relation to the figures, wherein.

DETAILED DESCRIPTION OF CERTAIN
ILLUSTRATIVE EMBODIMENTS

The general principle of the development is based, in the event of detection of switching of the screen for rendering a multimedia stream to screen saver mode, on a progressive reduction of the video quality of the item of digital content streamed in HTTP adaptive streaming mode (HAS) by a multimedia stream player terminal, while maintaining the quality of the associated audio stream unchanged. This progressive reduction of the video quality makes it possible to optimize the consumption of network resources, for both the operator of the wide area communication network, and the local communication network, while making possible a rapid return to the rendering of the item of video content in the event of exiting the screen saver mode, and ensuring maintenance of the listening quality of the user for the audio portion of the stream.

Figure 1:
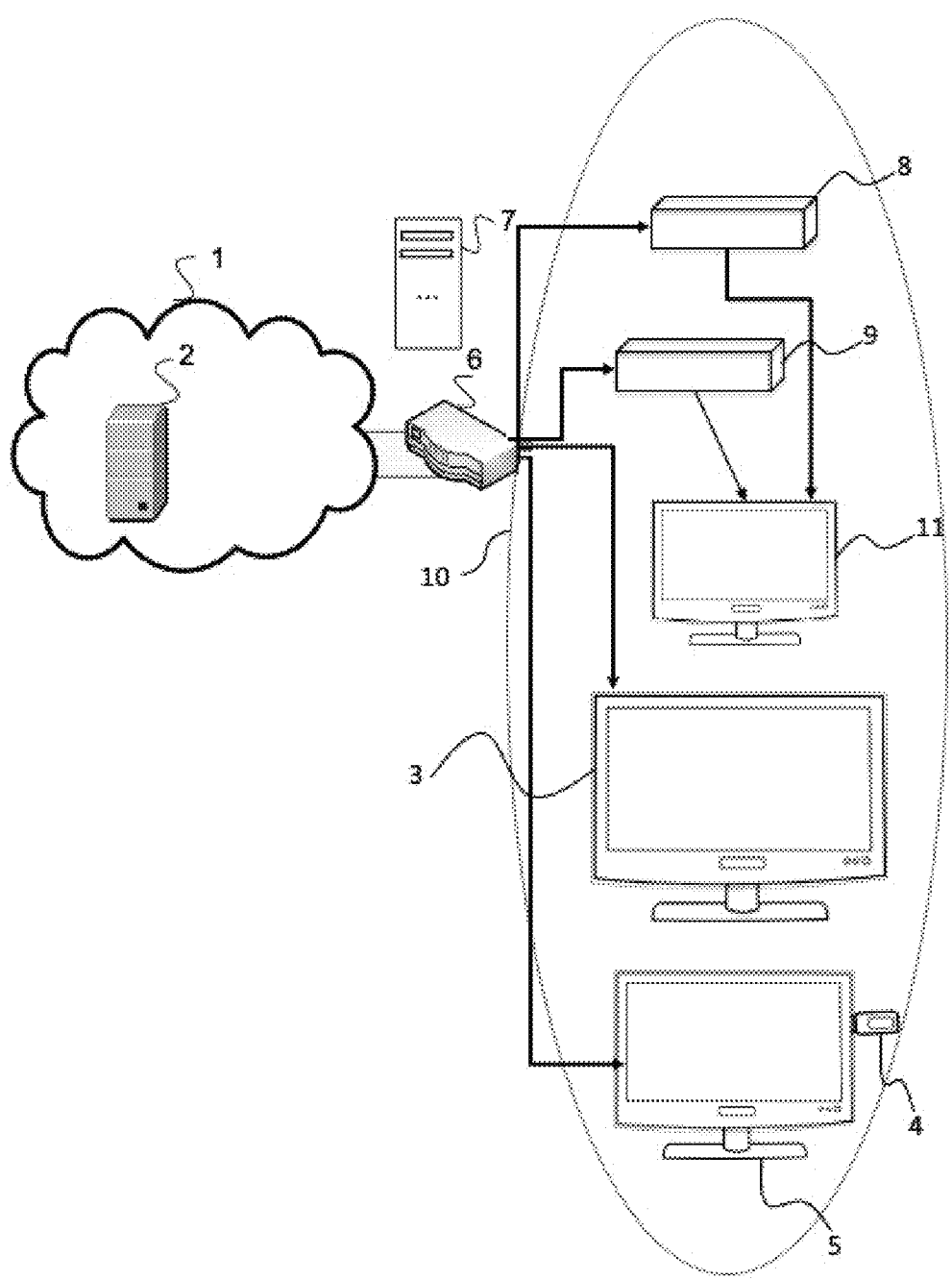
FIG. 1 shows an HTTP adaptive streaming architecture based on the use of adaptive streaming according to one embodiment of the development.

It is now presented, in relation to FIG. 1, a streaming architecture based on the use of the adaptive streaming according to the development.

The terminal 3, for example a smart TV, the terminal 4, for example an HDMI key connected to a television 5, the terminal 8, for example a games console connected to a rendering screen 11, the terminal 9, for example a digital decoder of the set-top-box type connected to a rendering screen 11, are in this example located in a local area network (LAN, 10) controlled by a home gateway 6. The context of the local area network is given by way of example and may be easily transposed to a best effort type Internet network, a corporate network, etc.

A digital content server 2 is according to this example in the wide area network (WAN, 1) but it may indifferently be located in the local area network (LAN, 10), for example in the home gateway 6 or any other equipment capable of hosting such a content server. The content server 2 receives for example digital television contents channels coming from a broadcast television network, not shown, and/or videos on demand, and makes them available for client terminals.

The client terminals 3, 4, 8 and 9 may enter into communication with the content server 2 in order to receive one or more contents (films, documentaries, advertising sequences, etc.).

It is frequent, in this client-server context, to resort, for exchanging data between the client terminals 3, 4, 8 and 9 and the server 2, to an HTTP adaptive streaming technique, HAS for short, based on the HTTP protocol. This type of technique particularly makes it possible to offer a good quality of contents to the user by taking into account bandwidth variations that may occur on the link between the client terminal 3, 4, 8 and 9 and the service gateway 6, or between the latter and the content server 2.

Conventionally, various qualities may be encoded for the same video content of a channel, corresponding for example to various bitrates. More generally, quality will be mentioned to refer to a certain resolution of the digital content (spatial, temporal resolution, quality level associated with the video and/or audio compression) with a certain bitrate. Each quality level is itself sliced on the content server into time segments (or fragments, chunks, these three words being used indifferently in the whole of this document). The sound track associated with the video segments may also be proposed according to one or more distinct quality levels.

The description of these various qualities and of the associated time segmentation, as well as the content fragments, are described for the client terminal and made available to it via their Internet addresses (URI: Universal Resource Identifier). All of these parameters (qualities, addresses of the fragments, etc.) are in general grouped into a parameter file, referred to as description file. It will be noted that this parameter file may be a computer file or a set of information describing the content, accessible at a certain address.

The terminals 3, 4, 8 and 9 possess their own features in terms of capacity of decoding, of display, etc. In a context of HTTP adaptive streaming, they may adapt their requests to receive and decode the content requested by the user to the quality that best corresponds to them. In our example, if the contents are available at the bitrates 512 kb/s (kilobits per second) (Resolution 1, or level 1, noted N1), 1024 kb/s (N2), 2048 kb/s (N3) and that the client terminal has a bandwidth of 3000 kb/s, it may request the content at any bitrate below this limit, for example 2048 kb/s. Generally, the content number i is noted "Ci@Nj" with the quality j (for example the j-th quality level Nj described in the description file).

The service gateway 6 is in this example a home gateway that ensures the routing of data between the wide area network 1 and the local area network 10, manages the digital contents particularly by ensuring their reception coming from the network and their decoding thanks to the decoders that are assumed here integrated into the gateway 6 or into the client terminals 3, 4, 8 and 9.

In this example, to view an item of content, the terminal 3, 4, 8 or 9 firstly queries the service gateway 6 to obtain an address for the desired description document 7 of the item of content (for example, C1). The service gateway 6 responds by providing the terminal with the address of the description file 7. In the following, it will be assumed that this file is a manifest type file according to the MPEG-DASH standard (noted "C.mpd") and reference will be made indifferently, according to the context, to the expression "description file" or "manifest".

Alternatively, this file may be retrieved directly from a local Internet server or from one external to the local area network, or already be on the service gateway or on the terminal at the time of the request.

By way of example, a manifest file (MPD) in accordance with the MPEG-DASH standard may include the description of contents available in three different qualities (N1=512 kb/s, N2=1024 kb/s, N3=2048 kb/s). Such a manifest file describes digital contents in an XML (eXtended Markup Language) syntax, comprising a list of contents in the form of fragments conventionally described between an opening tag (<SegmentList>) and a closing tag (</SegmentList>). The slicing into fragments particularly makes it possible to precisely adapt to fluctuations of the bandwidth. Each fragment corresponds to a certain duration ("duration" field) with a plurality of video quality levels and makes it possible to generate their addresses (URL—Uniform Resource Locator). This generation is carried out with the aid of "BaseURL" elements ("HTTP://server.com") that indicate the address of the content server and "SegmentURL" that lists the complementary portions of the addresses of the various fragments:

"C1_512 kb_1.mp4" for the first video fragment of the item of content "C1" at 512 kilobits per second ("kb") in MPEG-4 ("mp4") format,
"C1_512 kb_2.mp4" for the second fragment,
etc.

Such a manifest file also comprises a description of the audio portion of the item of content, also sliced in the form of fragments, with their corresponding address.

Once it has the addresses of fragments corresponding to the desired content, the service gateway 6 carries out the obtaining of the fragments via a downloading of these addresses. It will be noted that this downloading is carried out here, traditionally, through an HTTP URL, but may also be carried out through a universal address (URI) describing another protocol (dvb://mysegmentofcontent for example).

By way of example, interest is taken in the remainder of this description to the smart TV 3, of which it is assumed that it is used to access television programmes, by means of for example the TV application of the Applicant. The following description may of course be transposed to any one of the other multimedia stream player terminals 4, 8 and 9 of FIG. 1.

It is assumed that the user has therefore launched the TV application of the Applicant on the smart TV 3, which therefore displays on its screen a home page, referred to as DESK, on which figure a set of static images corresponding to the buttons or links for accessing the items of a menu (access to VOD, access to Replay, electronic program guide, etc.). Furthermore, in the background, is displayed a video stream corresponding for example to the last television channel viewed live by the user. Subsequently, this television programme is designated under the name of content C1. Such an item of content C1 is described in a manifest file 7.

Conventionally, the smart TV 3 has a screen saver function, designed by the manufacturer to prevent any deterioration of the screen in the event of prolonged display of one or more static images. This function is known, and therefore will not be described here in more detail. It is configured by the manufacturer of the smart TV 3, who decides, depending particularly on the technology of the screen (LED, LCD, OLED, etc.), the maximum permitted duration for displaying static images on the screen, beyond which the screen saver mode should be activated, to preserve the latter.

If, after launching the TV application of the Applicant, the user does not undertake further action (no selection of a live programme or of an item of pre-recorded content for example), and that the DESK home page therefore remains displayed for a certain time, the static images that it contains are likely, eventually, to deteriorate the screen of the smart TV 3. After a period of prolonged inactivity of the user, for example of 30 minutes, the smart TV 3 therefore activates the screen saver mode. It will be noted that various techniques exist making it possible to detect the absence of action of the user, which are not part of the present development, and therefore will not be described here in more detail. The manufacturer of the smart TV 3 is responsible for choosing the mode for detecting the prolonged inactivity of the user.

At the end of the maximum duration configured by the manufacturer, the screen saver mode is therefore activated, which consists in displaying on the screen of the smart TV 3, a standby screen designed by the manufacturer, and optionally configurable by the user. Such a standby screen displays simple dynamic images, for example the current time, a moving logo of the manufacturer, or also a succession of images or photographs of landscapes.

Figure 2:
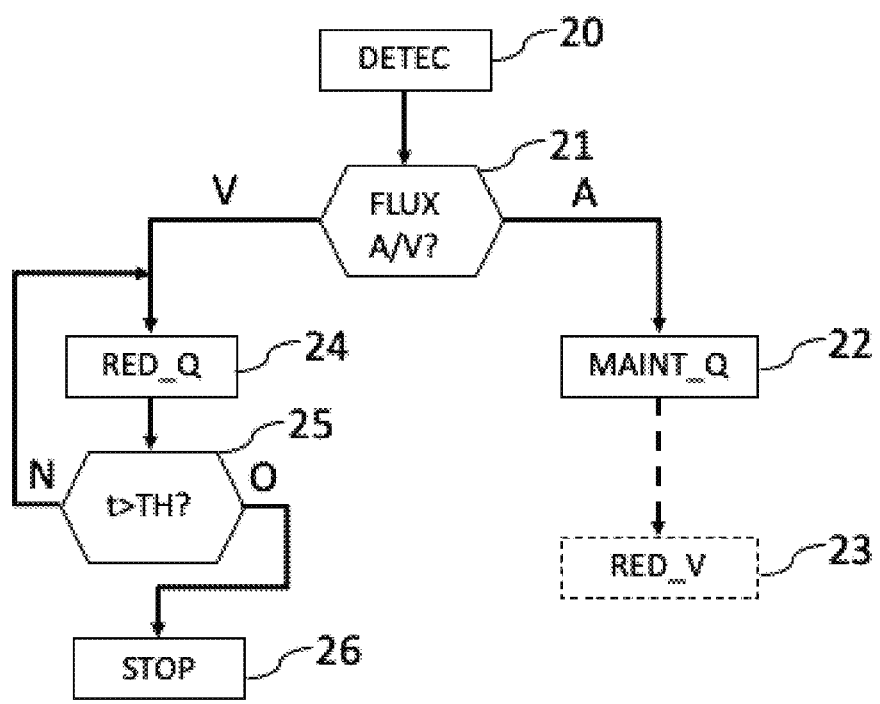
FIG. 2 illustrates in the form of a flow chart the various steps implemented by the method for managing the HTTP adaptive streaming of an item of digital content in screen saver mode according to one embodiment of the development.

As illustrated in FIG. 2, the activation of the screen saver mode may be combined with a notification, which may be detected, during a DETEC step 20, by the software applications being executed on the smart TV 3.

During a step referenced 21, these software applications (for example the TV application of the Applicant) analyse the nature of the multimedia stream in the process of HAS streaming from the server 2.

As illustrated by the left part of the flow chart of FIG. 2, if this stream corresponds to an item of video content V, the software application undertakes, during a RED_Q step referenced 24, of progressively reducing the quality of the streamed item of video content, according to a principle that will be described in more detail in relation to FIG. 3. This progressive reduction of the quality of the downloaded video stream is carried out during a determined duration TH, on condition that the user remains inactive, and therefore that the screen saver mode remains activated on the smart TV 3. At the end of this duration period TH, evaluated during step 25, the HTTP adaptive streaming of the item of content C1 is interrupted during a STOP step referenced 26.

As illustrated by the right part of the flow chart of FIG. 2, if this stream corresponds to an item of audio content A, or comprises an audio stream (for example a sound track associated with an item of video content V), the software application maintains (MAINT_Q step 22) the quality of the downloaded audio stream, throughout the entire duration of activation of the screen saver mode. As a variant, illustrated in dotted lines in FIG. 2, the quality of the audio stream A is maintained, but the rendering sound volume of the audio stream A is progressively reduced during a RED-V step 23, for example until the end of the duration period TH. This variant is particularly interesting when the audio stream A corresponds to the sound track of a video stream V.

Figure 3:
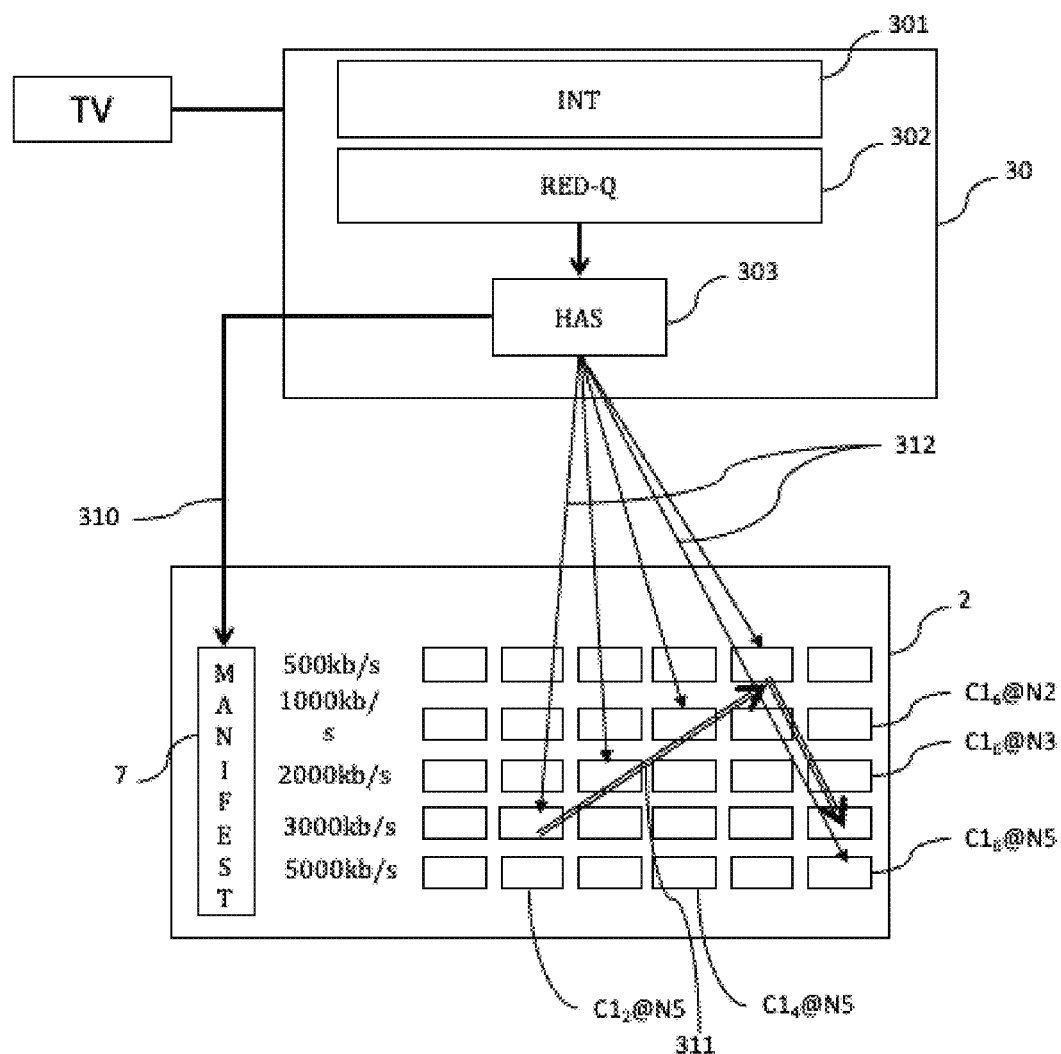
FIG. 3 describes in more detail the principle of reducing the video quality of the item of content in an HTTP adaptive streaming (HAS) context, in the embodiment of FIG. 2.

It is now presented in more detail, in relation to FIG. 3, the principle of progressively reducing the quality of the video stream carried out during the RED_Q step 24 of FIG. 2.

The real-time multimedia stream player terminal 30 is connected to a TV rendering screen: for example, the HDMI key 4 of FIG. 1 is connected by means of an HDMI link to a television screen 5, or the multimedia stream player terminal 30 and the rendering screen TV are integrated into the same equipment, such as the smart TV 3. The real-time multimedia stream player terminal 30 comprises an INT module 301 for interfacing with the rendering screen TV, a RED_Q module 302 for progressively reducing the quality of a streamed item of content, and an HAS client module 303.

An HAS content server 2 discloses a video C1 in the form of chunks $C1_i@Nj$ encoded at various encoding rates Nj, where the index i designates a time identifier of the chunk $C1_i@Nj$.

According to the prior art, an HAS client module is responsible for retrieving its chunks from the HAS content server 2 by choosing the video quality Nj depending on the available network resource. It is not described in more detail here the manner in which the HAS client module chooses the encoding rate of the next video fragment to be downloaded: indeed many algorithms exist making it possible to make this choice, the strategies of which are more or less secure or aggressive. However, it is reminded that, most often, the general principle of such algorithms is based on downloading a first fragment at the lowest encoding rate proposed in the manifest, and evaluating the time for retrieving this first fragment. On this basis, the HAS client module evaluates whether, depending on the size of the fragment and of the time taken to retrieve it, the network conditions make it possible to download the following fragment at a higher encoding rate. Certain algorithms are based on a progressive increase of the quality level of the downloaded content fragments; others propose riskier approaches, with jumps in the levels of the encoding rates of the successive fragments.

In the conventional case, if a video chunk lasts 3 seconds, the retrieval of the chunk by the HAS client module must not exceed 3 seconds, in order to make it possible to render without interruption the content by the terminal 30. Therefore, the HAS client module should make the best compromise between a rendering quality, and therefore an encoding rate, as high as possible, and the time for downloading the fragment, which must be short enough to make it possible to continuously render on the rendering screen TV.

In the embodiment illustrated in FIG. 3, on the other hand, the HAS client module 303 may not command the streaming of the fragment at the optimal encoding rate, in order to optimize the consumption of network resources, in the case where the screen saver mode or the rendering screen TV has been activated.

During a step referenced 310, the HAS module 303 retrieves the manifest file 7 in order to discover the available fragments of the video content C1, and the various associated video qualities Nj. In the example in FIG. 3, the item of content C1 is for example proposed in the form of fragments of duration 3 s, with a first encoding rate N1=500 kb/s, a second encoding rate N2=1000 kb/s, a third encoding rate N3=2000 kb/s, etc.

In a normal operating mode, not illustrated in FIG. 3, the HAS module 303 carries out the streaming for example, of successive fragments $C1_1@N1$ (i.e. the first time fragment at an encoding rate of 500 kb/s), then $C1_2@N3$ (i.e. the second time fragment at an encoding rate of 2000 kb/s), then $C1_3@N3$ (i.e. the third time fragment at an encoding rate of 2000 kb/s), etc.

The various fragments streamed by the HAS client module 303 are transmitted to the INT interface module 301 for their rendering to the user on the rendering screen TV (for example the screen of the smart TV 3).

The algorithm implemented by the HAS client module 303 to determine which fragment at which encoding rate must be streamed in normal operating mode (that is to say outside of periods where it is controlled by the RED_Q module 302 for progressively reducing the quality) may be one of the already existing algorithms of the prior art. This algorithm will therefore not be described here in more detail.

At the same time, in accordance with FIG. 3, the INT module 301 monitors the activation of the screen saver mode of the rendering screen TV, and receives for example, a notification of activation or of deactivation of the display of the standby screen on the rendering screen TV. It transmits this information to the RED_Q module 302.

Upon receipt of an item of information for activating the screen saver mode, the RED_Q module 302 initiates a timer, for example for a duration TH of two or three hours. At the same time, the RED_Q module 302 sends a command to the HAS client module HAS 303, in order to force the latter to progressively reduce the quality of the streamed video content time fragments, in order to reduce the consumption of network resources.

Thus, as illustrated in FIG. 3, the HAS client module 303 will successively stream (312) the fragments $C1_2@N4$, $C1_3@N3$, $C1_4@N2$ and $C1_5@N1$, to reduce the rendering quality of the item of content C1, as illustrated by the arrow referenced 311, up to the lowest quality proposed in the manifest 7, corresponding to a bitrate of 500 kb/s.

In practice, the reduction 311 of encoding rates of the time fragments is not as fast, but is spread over time, for example over a period of one hour. FIG. 3 therefore corresponds to a simplified illustration of this principle, making it possible to understand it visually. For example, the HAS client module 303 controls the streaming of successive time fragments with the quality level N4 for a duration of fifteen minutes, then lowers this level by streaming the time fragments with the quality level N3 for the following quarter of an hour, and so on, until the lowest quality level N1 provided for in the manifest 7 is reached, after the duration TH.

If, at the end of this duration TH (one hour for example), no new interaction of the user has been detected, and that the screen saver mode therefore remains active, the RED_Q module 302 sends to the HAS client module 303 a command to interrupt the streaming of the item of content C1, which is executed: the unnecessary consumption of network resources then stops.

If, on the other hand, at any time during this period of reducing the quality of the video stream, the user manifests their presence, for example by activating the remote control of the smart TV 3, the latter therefore deactivates the screen saver mode. This change of state is detected by the INT interface module 301, which informs the RED_Q module 302 of this. The display of the video stream C1 is therefore no longer masked by the standby screen, and it is important to be able to rapidly resume a quality rendering, for the visual comfort of the user. The RED_Q module 302 sends to the HAS client module 303 a command to return to normal. The HAS client module 303 then determines, depending on the network conditions, the optimal time fragment rate to which it may be entitled, and launches the streaming of the next fragment at this optimal rate: in the example of FIG. 3, the HAS client module 303 then streams the time fragment $C1_6@N5$.

Figure 4:
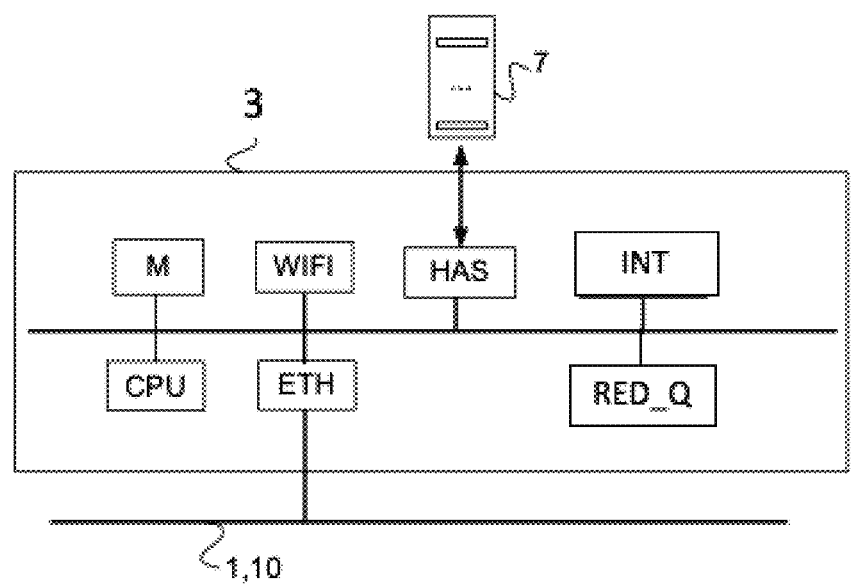
FIG. 4 shows an architecture of a real-time multimedia stream player terminal according to one embodiment of the development, for example the smart TV 3 of FIG. 1.

FIG. 4 represents an architecture of a real-time multimedia stream player terminal according to one embodiment of the development, for example the smart TV 3 of FIG. 1.

Conventionally, it comprises memories M associated with a processor CPU. The memories may be of the ROM (Read Only Memory) or RAM (Random Access Memory) or Flash type. The smart TV 3 communicates with the local area network 10 and wide area Internet network 1 via the WIFI module or the Ethernet module ETH. The smart TV 3 further comprises an HTTP adaptive streaming (HAS) module capable of requesting a progressive downloading of one of the contents with one of the qualities proposed in a description file 7. This description file 7 may be saved for example in the memories M of the smart TV 3 or be outside.

The smart TV 3 also comprises a module for progressively reducing the quality of an item of RED_Q content, which controls the HTTP adaptive streaming (HAS) module, in order to force the latter to request a streaming of the item of content with a quality, proposed in the description file 7, lower than the optimal quality at which it may be entitled, in the case where the screen saver mode has been activated.

The smart TV 3 according to the development may also contain other modules such as a hard drive not shown for storing video fragments, a module for controlling access to the contents, a module for processing commands received from a remote control, etc.

The smart TV 3 also integrates an INT module for managing the interface with the rendering screen, through which it particularly obtains information about the activation or the deactivation of the screen saver mode, and therefore the display of the associated standby screen.

It will be noted that the term module may correspond to a software component as well as a hardware component or a set of software and hardware components, a software component itself corresponding to one or more computer programs or subprograms or more generally to any element of a program capable of implementing a function or a set of functions such as described for the modules concerned. In the same manner, a hardware component corresponds to any element of a hardware assembly capable of implementing a function or a set of functions for the module concerned (integrated circuit, smart card, memory card, etc.).

More generally, such a smart TV 3 comprises a random access memory (for example a RAM memory), a processing unit equipped for example with a processor CPU, and controlled by a computer program, representative of a module for managing the HTTP adaptive streaming (HAS), stored in a read-only memory (for example a ROM memory or a hard drive). Upon initialisation, the code instructions of the computer program are for example loaded into the random access memory before being executed by the processor CPU of the processing unit. The random access memory particularly contains the manifest description file 7. The processor of the processing unit controls the detection of the activation of the screen saver mode, the analysis of the audio and/or video components of the streamed item of content, the progressive reduction of the quality of the streamed video content, through the selection of time segments and associated encoding rates to be streamed, the maintenance of the quality of the streamed audio content and the emission of corresponding commands to the HAS client module.

FIG. 4 only illustrates a particular way, from a plurality possible, to produce the smart TV 3, so that it performs the steps of the method detailed hereafter, in relation to FIGS. 2 and 3 (in any one of the various embodiments, or in a combination of these embodiments). Indeed, these steps may be performed indifferently on a reprogrammable calculation machine (a PC computer, a DSP processor or a microcontroller) executing a program comprising a sequence of instructions, or on a dedicated calculation machine (for example a set of logic gates such as a FPGA or an ASIC, or any other hardware module).

The terminal illustrated in FIG. 4 may more generally correspond to any multimedia stream player terminal capable of streaming a multimedia stream in HAS, such as a games console, an HDMI key (for example the Clé TV® from Orange or the Chromecast® from Google®), or a digital decoder of the set-top-box type.

The invention claimed is:

1. A method of managing HTTP adaptive streaming of an item of digital content within a multimedia stream player terminal in a local communication network, the multimedia stream player terminal being associated with a terminal for rendering the digital content,
wherein, on detection of an active state of a screen saver mode of the rendering terminal, the management method comprises progressively reducing a video rendering quality of the streamed item of digital content, while maintaining an audio rendering quality of the item of content.

2. The management method according to claim 1, wherein the item of digital content being associated with a file for describing the item of digital content, comprising a list of video time segments of the item of content each associated with a plurality of encoding rates of the item of content, the progressive reduction of a video rendering quality of the streamed item of digital content is based on a streaming of video time segments of the item of content associated with encoding rates decreasing over time.

3. The management method according to claim 2, wherein at the end of a predetermined duration period of absence of interaction of a user with the multimedia stream player terminal and/or with the rendering terminal after detection of the active state of the screen saver mode, the management method comprises interrupting the streaming of video time segments of the item of content.

4. The management method according to claim 1, wherein, on detection of the active state of the screen saver mode of the rendering terminal, the management method also comprises progressively reducing a rendering sound volume of the item of content.

5. The management method according to claim 1, wherein on detection of an interaction of the user with the real-time multimedia stream player terminal and/or with the terminal for rendering the item of digital content, the screen saver mode of the rendering terminal switches into an inactive state and the progressive reduction of rendering quality is interrupted, and wherein the method comprises streaming time segments of the item of content associated with optimized encoding rates depending on a resource constraint estimated by the real-time multimedia stream player terminal.

6. The management method according to claim 1, wherein the audio rendering quality is a function of one among: a quality level associated with an audio compression, a spatial resolution, a temporal resolution and a bitrate.

7. The management method according to claim 1, wherein maintaining an audio rendering quality of the item of content does not change the audio rendering quality of the item of content.

8. A processing circuit comprising a processor and a memory, the memory storing program code instructions of a computer program for implementing a method for managing HTTP adaptive streaming of an item of digital content within a multimedia stream player terminal in a local communication network, the multimedia stream player terminal being associated with a terminal for rendering the digital content, when the computer program is executed by the processor, the method comprises, on detection of an active state of a screen saver mode of the rendering terminal:
  implementing a progressive reduction of a video rendering quality of the streamed item of digital content, while
  maintaining an audio rendering quality of the item of content.

9. A device for managing HTTP adaptive streaming of an item of digital content within a multimedia stream player terminal in a local communication network, the multimedia stream player terminal being associated with a terminal for rendering the item of digital content,
  wherein the device comprises a processor configured to:
    detect an active state of a screen saver mode of the rendering terminal; and
    progressively reduce a video rendering quality of the streamed item of digital content while maintaining an audio rendering quality of the item of content, on detection of the active state of the screen saver mode.

10. The management device according to claim 9, wherein, the item of digital content being associated with a file for describing the item of digital content, comprising a list of video time segments of the item of content each associated with a plurality of encoding rates of the item of content, the processor being further configured to emit commands for streaming video time segments of the item of content associated with encoding rates decreasing over time.

11. A smart TV, comprising a processor configured for HTTP adaptive streaming of an item of digital content, and a screen for rendering the streamed item of digital content, wherein the processor is further configured to detect an active state of a screen saver mode of the rendering screen, and wherein, on detection of the active state of the screen saver mode, the processor is configured to progressively reduce a video rendering quality of the streamed item of digital content while maintaining an audio rendering quality of the item of content.

* * * * *